Patented Apr. 8, 1947

2,418,507

UNITED STATES PATENT OFFICE 2,418,507

PRODUCTION OF SPINNABLE VINYL RESIN COMPOSITIONS

Roland D. Glenn, South Charleston, W. Va., assignor to Carbide and Carbon Chemicals Corporation, a corporation of New York No Drawing. Application August 16, 1944, Serial No. 549,798

7 Claims. (Cl. 260—32)

This invention relates to the production of spinnable vinyl resin compositions capable of being formed into continuous filaments, threads, yarns and the like by commercially practicable spinning operations. It has especial utility for the production of continuous filaments and threads from dispersions in acetone or other volatile solvent of vinyl resins having relatively high vinyl chloride contents and high average molecular weights, such as those formed by the so-called emulsion polymerization of at least one vinyl compound including a vinyl halide. These resin dispersions often are not spinnable or are difficultly spinnable by the usual spinning operations.

Vinyl resins made by the copolymerization of a vinyl halide with another unsaturated polymerizable compound, such as a vinyl ester of an aliphatic acid, or an acrylic compound such as acrylonitrile or the acrylic acid esters, or the methacrylic acid esters, have long been known. The manufacture of filaments and other textile articles from certain copolymers of vinyl chloride and vinyl acetate is described in United States Patent No. 2,161,766 of E. W. Rugeley, T. A. Feild, Jr., and J. F. Conlon. Likewise, the production of spinning solutions, filaments and other textile articles from certain vinyl halide-acrylonitrile copolymers is described in the pending application, Serial No. 476,616, of E. W. Rugeley, T. A. Feild, Jr., and J. L. Petrokubi, filed February 20, 1943.

In instances when the resin employed has been produced by polymerizing the vinyl compounds in solution in acetone or other volatile solvent until the resin possesses the requisite high molecular weight, specific viscosity and vinyl chloride content, it is readily possible to prepare concentrated dispersions of the resin in a spinning solvent such as acetone, which are readily filterable and spinnable, at temperatures around 50° C., in accordance with the usual practice.

In recent years processes have been developed for producing these vinyl resins by the so-called emulsion polmerization type of process wherein a vinyl halide, with or without the addition of another polymerizable vinyl compound, in the form of an aqueous emulsion containing a polymerization catalyst, is polymerized to produce vinyl resins having properties rendering them suitable for use in making spinnable dispersions in volatile solvents, notably acetone. Processes of this type are described in United States Patent No. 2,068,424, and in the aforementioned pending application, Serial No. 476,616.

Efforts are constantly being made to improve the physical properties of yarns made from such resins by utilizing resins of higher average molecular weights and higher vinyl chloride contents. The production of such resins is more readily accomplished by emulsion polymerization processes. It is not necessary to fractionate these resins for removal of the lower molecular weight portions. However, during the production of the higher molecular weight resins by emulsion polymerization processes the resins may reach a critical state where they possess inadequate solubility in acetone or other spinning solvent to render dispersions thereof practically spinnable by the established dry-spinning and wet-spinning procedures.

As a result, the task of making smooth, gel-free spinnable dispersions of these vinyl resins which do not clog the candle filters and cause excessively high back pressures in filters and spinnerette passages often is very great, and differs considerably without any apparent reason, in dispersions made under similar conditions.

Among the more important objects of the present invention are: the preparation of uniform spinnable vinyl resin dispersions adapted for the continuous production of filaments, yarns, etc., from vinyl resins made by the emulsion type of polymerization of at least one polymerizable vinyl compound including a vinyl halide; the production of concentrated spinnable dispersions of vinyl resins having vinyl chloride contents and/or average molecular weights and specific viscosities too high to render such dispersions spinnable by the usual procedures heretofore used; to provide spinnable dispersions of vinyl resins which normally form with volatile spinning solvents dispersions containing small quantities of resins difficultly soluble or dispersible in the solvent at the spinning temperatures; and to provide for the production of exceptionally clear dispersions of excellent spinnability from a grade of vinyl resin not heretofore found useful for the purpose, without lowering the tensile strengths and other desired physical properties of the filaments spun therefrom.

Vinyl resins, dispersions of which are not readily spinnable but which are rendered capable of producing excellent spinnable dispersions as a result of treatment in accordance with this invention include those made by the conjoint emulsion polymerization of a vinyl halide and a vinyl ester of an aliphatic acid, which resins contain between about 80% and about 95% of the halide in the polymer, and have average macromolecular weights commonly of 25,000 and upward. Resins of this type having average macromolecular weights above 25,000, and particularly between 26,000 and 29,000, and/or having vinyl chloride contents of around 90% to 92%, are especially benefitted by the invention, and are rendered suitable for the spinning of filaments and yarn by conventional procedures. (Molecular weights mentioned herein are calculated by means of Staudinger's formula from viscosity measurements of solutions of the resins.) Other suitable resins benefitted by the invention include those made by the emulsion polymerization of a vinyl halide with acrylonitrile, which resins contain between around 45% and around 80% of the halide in the polymer, and have specific viscosities at 20° C. of at least around 0.2, and especially those resins having vinyl chloride contents of around 55% or more and specific viscosities of 0.35 or higher.

For convenience and simplicity the invention will be illustrated in connection with the preparation of spinnable dispersions in acetone of vinyl resins produced by the conjoint polymerization of vinyl halides with vinyl esters of aliphatic acids, and with acrylonitrile.

A typical process for the production of spinable dispersions from vinyl resins made by polymerizing at least one vinyl compound including a vinyl halide is described in the aforesaid United States Patent No. 2,161,766. It comprises the dispersion of the resin in a volatile spinning solvent such as acetone by working or kneading the resin and acetone in a closed dough-type mixer while at a temperature below the boiling point of the acetone, and preferably around 50° C. Any vaporized acetone is refluxed and returned to the mixer. The resultant spinning "dope," when intended for use in a dry-spinning type of operation, is a very viscous slowly flowable mass at 50° C. ("Dopes" useful for wet-spinning are more dilute and less viscous.) This viscous dispersion is then forced through a high-pressure filter press by a gear pump. The filter medium may be any suitable material capable of removing the last traces of undispersed or insoluble material from the "dope." The filtered "dope" is thoroughly deaerated, preferably by standing for about six hours at the spinning temperature of around 50° C. It is then forced under high pressure through a spinnerette of well-known type, the spinning operation or filament extrusion being carried out either in equipment customarily employed for the so-called "dry-spinning" or in that used for the "wet-spinning" of synthetic filaments.

This manner of preparation frequently yields dispersions which contain resin gel particles and which are not spinnable by the usual processes, especially when the resins have the higher average molecular weights of those produced by well-known emulsion polymerization procedures.

In the practice of the present invention, such a resin dispersion, which is not readily spinnable by the usual wet- and dry-spinning processes, is heated to an elevated temperature within the range between around 80° C. and around 100° C. at some stage or stages in its preparation, or its subsequent filtration or storage, and while under superatmospheric pressure sufficient to prevent loss of acetone or other solvent. The heating time may range from as little as five minutes upwardly, depending upon the temperature to which the resin dispersion is thus heated. The upper temperature limit is dictated by the decomposition point of the resin and by the pressure equipment available for the operation. For practical reasons temperatures within the range between 80° C. and 100° C. preferably are employed for periods usually ranging between 5 minutes and 1 hour, the higher temperatures usually being employed with the shorter periods of exposure at such temperatures. Preferably the dispersion is maintained in an atmosphere of an inert gas such as nitrogen or carbon dioxide during the heat treatment under a pressure in excess of the vapor pressure of the solvent at the temperature of the treatment.

The vinyl resin dispersion may be heat treated either batchwise or continuously, and before, during or even after the high temperature filtration. When a continuous type of heat treatment is employed it is generally applied at a heated filter press in connection with the high pressure, high temperature filtration of the dispersion, since this provides adequate time for the treatment, excellent contact of the resin dispersion with the heat transfer elements of the filter, and good agitation of the dispersion during the heat treatment.

According to one preferred form of the invention a vinyl resin of the type herein described may be dissolved in acetone at temperatures within the range between 40° C. and 60° C. in a closed high pressure, jacketed-type kneading mixer. In instances where temperatures below the normal boiling point of the solvent are used in the initial preparation of the resin dispersion, the latter, after its formation, may be heated with agitation for a period of from 5 minutes to 1 hour or more to a temperature within the range between around 80° C. and around 100° C. in a jacketed autoclave or other pressure-tight apparatus, while under a superatmospheric pressure sufficient to prevent loss of the acetone or other solvent. Preferably during this heating step the resin dispersion is maintained in an atmosphere of an inert gas such as nitrogen or carbon dioxide. This assists in preventing the formation of a "skin" of hardened resin on the walls of the autoclave, apparently caused by the local evaporation of acetone from a stagnant layer of the resin dispersion adjacent the hot walls. The dispersion is then filtered at a temperature between 55° C. and 100° C., cooled, if necessary, to about 55° C., and spun in the conventional manner.

In accordance with another preferred form of the invention wherein the heat treatment is conducted in a continuous manner, the dispersion of the vinyl resin, produced by kneading the mixture of resin and acetone at a temperature below the boiling point of the acetone, for example, around 50° C., is forced through a heated pressure filter under high pressure by means of a gear pump. A plate- and frame-filter press having alternate plates heated internally with hot water or steam may be used, whereby the resin dispersion passing therethrough attains a temperature of around 80° C. to 85° C. or more for a brief period of not less than 5 minutes, and preferably for from 10 to 30 minutes or more. The heated solution, after being cooled to around 30° C. to 55° C., may be fed directly to the candle filter in the spinning cell. Preferably the heat treated resin dispersion flows from the pressure filter to a pressure storage and aging vessel where gradual cooling occurs, and from which a portion is continuously withdrawn and conducted to the spinning cell as required.

For practical reasons it is desirable, when using acetone as the solvent, to agitate the resin and acetone in a pressure-tight kneading type of mixer, while heating it to a temperature not higher than around 50° C. to 55° C. until dispersion of the resin has been effected, after which the dispersion is heated under pressure to a temperature of between around 80° C. and around 90° C. for about one hour. The hot dispersion is then filtered while at a temperature within the range between around 55° C. and around 90° C. The filtered dispersion is cooled to around 50° C. to 55° C., and may then be stored at such temperatures until required, or it may be directly forced through a candle filter and spun in the usual manner described in United States Patent No. 2,161,766, and in the aforesaid pending application, Serial No. 476,616.

The heat-treated resin dispersions of the invention have somewhat lower viscosities than untreated resin dispersions of the same concentration, measured at the same temperature. It is advantageous therefore to spin dispersions having higher resin contents than heretofore has been found practical. Dispersions useful for dry spinning operations may conveniently have resin concentrations of 20% to 35% or more; while those useful in wet-spinning operations may have resin concentrations around 12% to 18% or more.

The following examples serve to illustrate the invention:

Example I

A vinyl resin formed by the conjoint polymerization of vinyl chloride and vinyl acetate by an emulsion polymerization process, which resin contained 91.1% of vinyl chloride in the polymer and had a specific viscosity at 20° C. of 0.307, and an average macromolecular weight of 26,800, was mixed with acetone in a "Day" type kneading mixer at temperatures between 40° C. and 55° C. to yield a resin dispersion containing 20% of the resin. The dispersion was hazy and contained resin gels which caused filtration difficulties. Serious back pressure developed during attempts to spin this resin solution by the dry spinning process employing standard equipment.

A quantity of this resin was dissolved in acetone in a kneading type mixer to form a more concentrated extremely viscous dispersion containing 31% of the resin. The dispersion was then heated to 90° C. for 1 hour in an atmosphere of nitrogen in a heat-jacketed glass-lined autoclave having an agitator and maintained under a nitrogen pressure of 45 pounds per square inch, gauge. After diluting the heat-treated dispersion to a resin content of 27%, it was filtered through a pressure filter while at 85° C., and was then cooled to around 50° C. This heat treated resin dispersion was of excellent clarity and possessed about the same viscosity as that of a 20% concentrated dispersion of the resin mixed at 50° C. only. The former exhibited excellent spinnability; and no excessive back pressure developed during the spinning thereof. The spun fibers, after being stretched 463% at 125° C. in a steam cell, had tenacities of 3.5 grams per denier, and had elongations of 18.8%.

Example II

A quantity of a vinyl chloride-vinyl acetate copolymer resin containing 90.8% of the chloride in the polymer and having a specific viscosity at 20° C. of 0.319 and an average macromolecular weight of 25,600, was mixed at around 50° C. in a closed kneading mixer with sufficient acetone to yield a dispersion containing 25% of the resin. The dispersion was then heated, with agitation, for one hour at 85° C. in an atmosphere of nitrogen, in a pressure-tight kneading mixer, while under a pressure of 49 pounds per square inch, gauge.

The resultant colorless spinning dispersion was filtered through a pressure filter while at 85° C. The filtered dispersion was then cooled to around 50° C., passed through a candle filter, and spun, using a dry-spinning procedure of the general type described in United States Patent No. 2,161,766.

The treated resin dispersion had excellent spinning qualities; and no excessive back pressure developed during spinning thereof. The spun filaments, when processed in the general manner described in Example I, had tenacities of 3.6 grams per denier, and elongations of 22%.

In contrast with these results, a 19.5% dispersion of the same resin in acetone, which dispersion was not given the heat treatment of this invention, had very poor spinning characteristics. During the course of the spinning operation an excessive back pressure of 420 pounds per square inch developed, over and above the pressure normally used, although the concentration of the resin in the dispersion was only 78% of that in a dispersion of the resin which, after the heat treatment of the invention, was entirely satisfactory for spinning.

Example III

A vinyl resin of the type described in Example II was dispersed at atmospheric pressure in approximately three times its weight of acetone in a closed dough-type mixer operating at a temperature of around 55° C. The resultant dispersion was pumped by a gear pump through a filter press in which alternate plates were internally heated to about 80° C. by means of hot water. The filtration of 1600 pounds of this dispersion through a heated 24-inch filter press having 24 plates required 4 hours. The filtered dispersion was then forced into a storage vessel maintained under a pressure of about 25 pounds per square inch gauge. The temperature of the dispersion gradually fell during storage so that, as it was pumped to the spinning apparatus, its temperature was around 40° C. to 45° C.

The heat treated dispersion was readily spinnable by a dry-spinning operation to provide filaments of good quality.

Example IV

A quantity of vinyl chloride-acrylonitrile copolymer resin containing around 60% of the chloride in the polymer and having a specific viscosity at 20° C. of .350, and produced by an emulsion polymerization process of the type described in the aforesaid pending application, Serial No. 476,616, was mixed with acetone in a closed kneading type mixer to yield a resin dispersion containing 19.5% of the resin.

The dispersion was somewhat hazy and slowly flowable at temperatures around 50° C. Its spinning properties were not satisfactory due to the excessive, constantly increasing back pressure in the spinning candle filter system during the spinning operation.

The aforesaid dispersion was then filtered under pressure through two jacketed type candle filters arranged in series. The first filter was heated to around 85° C. by hot water in the jacket thereof; and the resin dispersion was filtered at such a rate that it was exposed to this high temperature for approximately 5 minutes. The heated dispersion then was passed through the second filter which was cooled by means of water at room temperatures in the jacket thereof, to prevent or minimize loss of solvent from the dispersion upon the subsequent release of pressure.

The heat treated dispersion was transferred to a spinning container and spun in a dry-spinning type of apparatus. A very satisfactory spinning operation resulted. The rate of back pressure increase in the spinning-candle filter system during the operation was not excessive. The heat treated dispersion was of sparkling clarity; and of somewhat lower viscosity than the untreated dispersion.

Yarn spun from the heat treated dispersion, after being stretched 1289% at 132° C., and the stretched yarn stabilized by immersion in an untensioned state for 1 hour in water at 100° C., had a wet tenacity of 4.5 grams per denier, and an elongation of 26.5%. The yarn was of excellent quality; and the filaments thereof were of uniform size.

The vinyl resins used in the preparation of spinning dispersions in accordance with the invention preferably contain small amounts of heat stabilizers which provide adequate protection for the resin during the heat treatment, and afterwards during fabrication and use of textiles made therefrom. Among particularly suitable stabilizing agents for these resins may be mentioned the organo-metallic tin and lead compounds described in the V. Yngve Patents Nos. 2,267,777; 2,267,778; 2,267,779; 2,307,090 and 2,307,092; and the organo-metallic tin salts of alpha-beta-olefinic carboxylic acids described in the W. M. Quattlebaum et al. Patent No. 2,307,157. However, a wide variety of other well-known heat stabilizers for vinyl resins may be utilized, in amounts ranging upward from 0.1% of the resin.

By the practice of this invention it is possible to spin vinyl resin dispersions which, while formed from resins having excellent physical properties per se, are not commercially spinnable by standard spinning techniques because of the resins having unduly high vinyl chloride contents and/or average molecular weight, and because of being contaminated with small quantities of resins that are difficultly soluble in the spinning solvent due to insufficient control over the polymerization and resin recovery processes. Dispersions having higher resin concentrations may be successfully spun. This results in an economy of solvent and facilitates the treatment of the spun filaments and yarns for removal of the solvent.

The invention is susceptible of modification within the scope of the appended claims.

I claim:

1. Process for preparing a spinnable dispersion in a volatile spinning solvent of a vinyl resin formed by the emulsion polymerization of not more than two vinyl compounds including a vinyl halide, said resin containing components incompletely dispersible in the solvent at the spinning temperature and rendering a dispersion of the resin in said solvent not practically spinnable by conventional wet- and dry-spinning procedures, which comprises intimately mixing such a vinyl resin with said solvent at an elevated temperature to form a resin dispersion, filtering such dispersion under pressure, and conducting the resultant filtered dispersion to a spinning operation while at a temperature within the range between about 30° C. and about 55° C., and, at some stage in the process prior to said spinning operation, heating the resin dispersion for a period of at least five minutes to a temperature within the range between around 80° C. and around 100° C. but above the boiling point of the solvent at atmospheric pressure while under superatmospheric pressure sufficient to minimize local evaporation of the solvent, thereby providing a spinnable dispersion of greatly improved spinning characteristics.

2. Process for preparing a spinnable dispersion in a volatile solvent of a vinyl resin of high average molecular weight formed by the emulsion polymerization of not more than two vinyl compounds including a vinyl halide, which resin contains components incompletely dispersible in the solvent at the spinning temperature, thereby inhibiting the spinning of the resin dispersion in said solvent, which comprises intimately mixing such a vinyl resin with a body of said solvent to form a resin dispersion, filtering such dispersion under high pressure at an elevated temperature of at least 50° C., and conducting the filtered dispersion to a spinning operation while at a temperature within the range from 30° C. to about 55° C., and, at some stage in the process, heating the resin dispersion under pressure, for a period of from at least five minutes to an hour, to a temperature within the range between around 80° C. and around 100° C. but above the boiling point of the said solvent at atmospheric pressure, while preventing loss of solvent from said dispersion, thereby providing a spinnable dispersion of greatly improved spinning characteristics.

3. Process as defined in claim 2 wherein the solvent is acetone.

4. Process for preparing a spinnable dispersion in a volatile solvent of a vinyl resin formed by the emulsion polymerization of not more than two vinyl compounds including a vinyl halide, which resin contains components normally incompletely soluble in the solvent at the spinning temperature, thereby interfering with the spinnability of the dispersion by conventional wet- and dry-spinning procedures, which comprises intimately mixing such a vinyl resin with said solvent to form a concentrated resin dispersion, heating and agitating the said dispersion under superatmospheric pressure for a period of between five minutes and about one hour at a temperature within the range between around 80° C. and around 100° C. but above the boiling point of the said solvent at atmospheric pressure, in the presence of an inert gas, while preventing loss of solvent, filtering the resultant heat treated dispersion under high pressure while at a temperature within the range between around 55° C. and around 100° C., and conducting the thus heat treated and filtered resin dispersion to a spinning zone while at a temperature of between about 30° C. and about 55° C., thereby providing a spinnable dispersion of greatly improved spinning characteristics.

5. Process for preparing a spinnable dispersion in a volatile spinning solvent of a vinyl resin formed by the emulsion polymerization of not more than two vinyl compounds including a vinyl halide, which resin contains components normally incompletely soluble in the solvent at the spinning temperature, thereby interfering with the spinnability of said dispersion by conventional wet- and dry-spinning procedures, which comprises intimately mixing such a resin with said solvent to form a concentrated resin dispersion, filtering said dispersion and concurrently heating it for a period of between five minutes and one hour at a temperature within the range between around 80° C. and around 100° C. but above the boiling point of the said solvent at atmospheric pressure, while under a pressure at least as great as the vapor pressure of the solvent at said temperature, cooling the thus heat treated and filtered dispersion, and conducting it to a spinning zone while at a temperature of between about 30° C. and about 55° C., thereby providing at the spinning zone a spinnable dispersion having greatly improved spinning characteristics.

6. Process for preparing a spinnable dispersion in acetone of a vinyl resin formed by the conjoint emulsion polymerization of a vinyl halide with a vinyl ester of an aliphatic acid, which resin contains between about 80% and about 95% of the halide in the polymer and has an average macromolecular weight of at least 25,000, said resin containing components normally not completely dispersible in acetone at the spinning temperature, thereby interfering with the spinnability of a dispersion thereof in acetone by conventional wet- and dry-spinning procedures, which comprises intimately mixing such a vinyl resin with acetone at an elevated temperature to form a resin dispersion, filtering such dispersion under pressure, and conducting the resultant filtered dispersion to a spinning operation while at a temperature within the range between about 30° C. and about 55° C., and, at some stage in the process prior to said spinning operation, heating the resin dispersion for a period of at least five minutes to a temperature within the range between around 80° C. and around 100° C. while under superatmospheric pressure sufficient to minimize local evaporation of the acetone, thereby providing a spinnable dispersion of greatly improved spinning characteristics.

7. Process for preparing a spinnable dispersion in acetone of a vinyl resin formed by the conjoint emulsion polymerization of a vinyl halide with acrylonitrile, which resin contains between around 45% and around 80% of the halide in the polymer and has a specific viscosity at 20° C. of at least around 0.2, said resin containing components rendering a dispersion thereof in acetone difficulty spinnable by conventional wet- and dry-spinning procedures, which comprises intimately mixing such a vinyl resin with acetone at an elevated temperature to form a resin dispersion, filtering such dispersion under pressure, and conducting the resultant filtered dispersion to a spinning operation while at a temperature within the range between about 30° C. and about 55° C., and, at some stage in the process, prior to said spinning operation, heating the resin dispersion for a period of at least five minutes to a temperature within the range between around 80° C. and around 100° C. while under superatmospheric pressure sufficient to minimize local evaporation of the acetone, thereby providing a spinnable dispersion of greatly improved spinning characteristics.

ROLAND D. GLENN.

REFERENCES CITED

The following references are of record in the file of this patent:

UNITED STATES PATENTS

| Number | Name | Date |
| --- | --- | --- |
| 2,161,766 | Rugeley et al. | June 6, 1939 |